United States Patent Office 3,594,204
Patented July 20, 1971

3,594,204
USE OF CLAY IN SYSTEMS CONTAINING VINYL MONOMERS
John C. Nease, Piscataway, N.J., assignor to Engelhard Minerals & Chemicals Corporation, Edison, N.J.
No Drawing. Application Sept. 8, 1967, Ser. No. 666,491, now Patent No. 3,450,666, dated June 17, 1969, which is a continuation-in-part of application Ser. No. 457,176, May 19, 1965. Divided and this application Apr. 4, 1969, Ser. No. 842,039
Int. Cl. C09c 1/00
U.S. Cl. 106—288B          6 Claims

ABSTRACT OF THE DISCLOSURE

A small amount of a polyoxyethylene fatty acid ester is coated on a dry clay filler having surface acidity. When incorporated with an ethylenically unsaturated monomer, undesired polymerization of the monomer by the clay is prevented.

RELATED APPLICATIONS

This application is a division of my copending application Ser. No. 666,491, filed Sept. 8, 1967, now U.S. 3,450,666, which in turn was a continuation-in-part of a copending application Ser. No. 457,176, filed May 19, 1965, now abandoned.

BACKGROUND OF THE INVENTION

It is well known that clays, especially acidic clays, catalyze the polymerization of liquid vinyl monomers such as styrene when the clay is dry. The reaction between clay and monomer is accelerated when the monomer is warm or hot and occurs even when conventional polymerization inhibitors such as tertiary butyl catechol or hydroquinone are present. The patent literature contains many suggestions for putting this phenomenon to practical use. An example is U.S. 2,644,722 to Kaye. In accordance with the procedure described in this patent, an object such as mica is rapidly provided with a solid resinous surface coating by coating the surface of the object with vinyl monomer and clay. The latter remains as a filler in the coating after the polymerization of the monomer occurs.

While the exothermic reaction between the clay and the resin-forming polymerizable liquid in very desirable for certain applications, such as the one described, the reaction is very undesirable when it occurs in systems in which it interferes with the normal catalysis of a polymerizable monomer by a free radical initiator catalyst such as an organic peroxide. In this case, the reaction between clay and unsaturated monomer can lead to shortened pot life or to impairment of the physical properties of the cured clay-filled plastic. An example is when kaolin, an acidic clay, is used at a filler for a liquid polyester resin containing a vinyl monomer as the crosslinking agent. Reaction between clay and the crosslinking agent can have a detrimental effect on pot life or the properties of the finished plastic. The reaction between the clay and the ethylenically unsaturated monomer can be prevented or minimized by using moist clay. However, this means is not always practical or possible. For example, filler clay must be pulverized in order to facilitate the dispersion of the clay in an organic system; e.g., the clay must be free from agglomerates coarser than about 100 mesh. It is impossible, however, to pulverize moist clay because of the inherent plasticity of the moist clay. Moreover, the clay equilibrates with the atmosphere, and clay which is adequately moist and nonreactive after it has been pulverized may rapidly dry and become reactive when stored in a dry environment.

An object of this invention is the provision of a means for preventing the reaction between clay and an ethylenically unsaturated monomer normally polymerizable by the clay.

A particular object of this invention is the provision of a coated clay product which is especially adapted for use in resin systems including monoethylenically unsaturated monomers.

Another object is to provide a coated acidic clay product which is essentially inert towards a polymerizable monoethylenically unsaturated monomer.

This invention results from the discovery that a small amount of a polyoxyethylene fatty acid ester prevents the reaction between clays having surface acidity and ethylenically unsaturated monomers. The compounds which are used to prevent the reaction, in accordance with the present invention, are nonionic surface active agents prepared by reacting a fatty acid with an alkoxylating agent, such as ethylene oxide or polyethylene glycol.

In accordance with this invention, the polyoxyethylene fatty acid ester is employed in amount of $\frac{1}{2}\%$ to $5\%$ of the clay weight and may be incorporated as a precoating on the dry clay before the clay is incorporated into a solid or a liquid including an unsaturated monomer normally polymerizable by the clay or the ester may be added to the system containing the monomer before clay in added.

Using the preferred kaolin clay, which is an excellent filler clay but which is very reactive when dry, the surface active agent is employed in amount within the range of $\frac{1}{2}\%$ to $3\%$ of the clay weight. With more absorptive clays, such as heat-activated attapulgite clay, which is another clay material having acid sites on the surface of the clay particles, the nonionic agent can be used in amount of $2\%$ to $5\%$ of the clay weight. The presence of the ester as a coating on the clay or in mixture with the monomer system inhibits the normal reaction between the filler clay and a polymerizable monomeric monoethylenically unsaturated monomer. When employed as a coating, the ester also improves the ease with which the clay can be incorporated into liquid systems used in formulating plastics. Thus, the coated clays disperse readily in organic vehicles without undesirably increasing the viscosity of the vehicles.

The present invention finds application in the preparation of clay-filled polyester plastics from liquid unsaturated polyester resin mixes containing vinyl monomers as the crosslinking agent. As examples of vinyl monomers may be mentioned styrene, vinyl toluene, chlorostyrene and/or alphamethyl styrene. The use of a surface active polyoxyethylene fatty acid ester with clay filler, in accordance with this invention, obviates premature reaction between the clay and the monomeric crosslinking agent. With some laminating resin mixes, this will prevent surface blistering and/or delamination of the cured clay-filled laminate. In all cases, this will lengthen pot life.

The invention is also applicable to the preparation of plastics from liquid resins including a substantial amount of liquid polymerizable monomeric monoethylenically unsaturated compounds. For example, the use of the polyoxyethylene fatty acid ester prevents reaction of clay fillers used in the preparation of polystyrene plastics and acrylic plastics from styrene monomers and acrylic monomers, respectively. The esters also prevent reaction of clay fillers with polystyrene or polyacrylates containing unpolymerized styrene or acrylic monomers.

The following are examples of polymerizable monomeric monoethylenically unsaturated compounds normally polymerized by contact with clay having acid sites: Styrene, nuclearly halogenated styrene, alkylated styrene such as alpha-methylstyrene, vinyl chloride, vinyl fluoride, vinylidene chloride, di-vinyl benzene, vinyl toluene; vinyl esters such as vinyl acetate and vinyl trimethylacetate; vinyl ketones such as vinyl methyl ketone and vinyl propyl ketone; also acrylic and alphamethacrylic acids and derivatives thereof, such as esters, amides, nitriles, chlorides and anhydrides and including acrylonitrile, methacrylonitrile, allyl acrylate and methacrylamide. Frequently combinations of the aforementioned polymerizable monomers are employed when they are copolymerizable.

The polyoxyethylene fatty acid esters which are employed in the practice of this invention may be represented by the following formula:

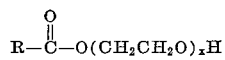

wherein R is selected from the group consisting of alkyl containing 7 to 19 carbon atoms, alkenyl containing 7 to 19 carbon atoms and abietyl, and $x$ is an integer from 2 to 50, inclusive. The esters may be made from pure acids, such as oleic acid or lauric acid, or naturally occurring fatty acid mixtures such as coconut fatty acids, tall oil acids, soybean acids may be used. Especially good results are obtained with liquid esters derived from acid mixtures such as coconut fatty acids which contain a substantial amount of C–12 fatty acid and which contain 5 to 15 mols of ethylene oxide per mol fatty acid.

The polyoxyethylene fatty acid esters used in practicing the invention are liquid or pasty at ambient temperature. The esters therefore are easy to coat on the clay filler or to incorporate uniformly with the monomer to be protected. When employed in amount sufficient to prevent polymerization of a monomer by the clay, this type of surface active material does not interfere with the subsequent polymerization of the monomer by a peroxide catalyst. Further, the ester does not contain nitrogenous constituents which may be undesirable when present in polymerizable systems.

Any clay filler material that normally catalyzes the decomposition of an ethylenically unsaturated monomer of the type above-described can be used in carrying out this invention. A characteristic of such clays is that acid sites are present on the surface of the clay particles. The presence of these sites is determined by $pK_a$ measurements. The surface acidity may be readily measured by the method of Walling, Cheves, J. Am. Chem. Soc., 72, pp. 1164–68 (1950), which depends upon the ability of the clay to change a neutral-base color indicator to its acidic color. Reactive clays have a $pK_a$ below 3.3 and highly reactive clays such as kaolin and attapulgite have a $pK_a$ less than 1. Another characteristic of these clays is that they are dry, i.e., the clay particles contain less than 1% free moisture (F.M.). Free moisture is the weight percent of a material eliminated by heating the clay material to constant weight at 220° F. While low in free moisture, the reactive clays may contain appreciable quantities of chemically combined water ("water of composition" or "water of crystallization").

Still another characteristic of the clays that are benefited by the use of a polyoxyethylene fatty acid ester, in accordance with this invention, is that the clays are free from additives that will fundamentally change the natural surface characteristics of the clay in a manner such as to react with or mask the acid sites on the clay. As examples of such additives, present with some commercial clays, may be mentioned clay dispersants such as alkali metal salts of condensed phosphates and alkali metal silicates. If present in substantial quantity, these alkaline dispersants, which may undesirably affect cured resins, neutralize acid sites on the clay. Another type of additive is one that provides a hydrophobic, or partially hydrophobic coating on the clay. To distinguish the clays I use from the commercially processed clays containing such additives, one group of the clays employed in carrying out this invention and used as filler clays, can be described as being "processed, but unmodified clay." Thus, the term "processed unmodified clay" as used herein excludes predispersed clays and hydrophobic clays. As examples of processed, unmodified clays which have been found to catalyze the decomposition of ethylenically unsaturated monomers the following may be mentioned: kaolin clay, including water-washed aid air-floated kaolin clays; ball clay; Wyoming bentonite (a sodium montmorillonite); calcium bentonite (a calcium montmorillonite from Arkansas); a commercial grade of colloidal attapulgite dried to a free moisture content below 1%; a heat-activated grade of attapulgite clay having a free moisture content below 1%.

The other group of dry clays having acid sites that is benefited by the use of the polyoxyethylene fatty acid esters is that of the acid-activated clays, exemplified by acid-activated kaolin clay and sub-bentonites, such as are widely used as catalysts in the cracking of hydrocarbons. A method for acid-activating kaolin clay is described in U.S. 2,967,157 to Alfred J. Robinson et al. Methods for acid-activating bentonite are described in U.S. 2,466,050 to Hubert A. Shabaker et al.

The preferred clay that is employed in carrying out this invention is kaolin clay, by which is meant a clay whose predominating mineral species is kaolinite, halloysite, anauxite, dickite or nacrite. These minerals are all hydrous aluminum silicates of the empirical formula $Al_2O_3 \cdot 2SiO_2 2H_2O$. Kaolin clay, as mined, consists of fine particles together with coarse agglomerates and grit (principally quartz). It is the usual practice of clay processors to remove from the clay coarse agglomerates and gritty matter. For some commercial uses, kaolin clay is fractionated, as by hydraulic or air sedimentation methods, to obtain a fraction of clay having the desired particle size. Usually the clay is fractionated to obtain a very fine fraction which is particularly useful as an ingredient of paper coating compositions. This leaves a coarse fraction, the particle size distribution of which will depend on the amount of fines removed from the whole clay during the fractionation. In carrying out my invention, I prefer to use a coarse fraction size of clay which has an average equivalent spherical diameter from 4 to 15 microns. Whole clay (which usually has an average equivalent spherical diameter of about 1.5 micron) and fine fractions of whole clay can also be used. It is also within the scope of this invention to employ kaolin clay which has previously been calcined. All micron particle sizes, as used herein, are expressed as equivalent spherical diameters and are obtained by the well-known Andreasen method (a water sedimentation method) assigning 2.5 as the value of particle density. The term "average equivalent spherical diameter" refers to the particle size of a material which is so chosen that 50% by weight of the particles will be finer than that value.

Another clay that could be used in carrying out this invention is attapulgite clay which has been heated at a temperature and for a time sufficient to reduce the free moisture content below about 1% by weight, e.g., the heat-activated grades of attapulgite clay which have been heated at a temperature within the range of about 400° F. to 1300° F. This clay, while it normally has a pH about 7, is considered to be an acid clay because it has acid surface sites which are detected by $pK_a$ evaluations.

Several methods may be used to precoat clay particles with the ester compounds. The simplest procedure involves dry milling the clay with an appropriate quantity of surface active agent. This method is suitable because the esters are normally liquid or semiliquid (pasty) at ambient temperature. The esters are easily coated on the clay particles because of their low melting points without the need for solvents and the use of a drying step although solvents such as mineral spirits may be used in the coating step.

With kaolin clay, the polyoxyethylene fatty acid ester is employed in amount within the range of about ½% to 3%, preferably about 1% to 2% of the clay weight. When employed in amount appreciably less than ½% by weight, reaction may occur between the clay and monomer. When employed with kaolin clay in amount appreciably in excess of 3%, the surface active agent may undesirably affect the properties of the resins with which the kaolin clay is employed. With activated attapulgite clay and other high surface area clays, somewhat larger quantities of polyoxyethylene fatty acid esters are recommended, i.e., from about 1% to 5% by weight, preferably about 2% to 4% by weight. The optimum quantity of surface active agent employed with a clay material will vary inversely with the particle size and surface area of the clay. The quantity of polyoxyethylene fatty acid ester will usually be kept at the minimum at which the agent is effective in preventing polymerization of the monomer by the clay since the use of excessive polyoxyethylene fatty acid ester may adversely affect the physical properties of the cured resin system.

The liquid unsaturated polyester resins to which the practice of this invention is applicable are obtained by reacting together a dihydric alcohol and a dibasic acid, either of which contains a pair of double-bonded carbon atoms. The unsaturated long chain polyester molecule is essentially linear and is capable of being crosslinked to form a thermosetting resinous solid through the double bonds in the ester. A liquid unsaturated monomer, such as styrene, vinyl toluene, alpha-methyl styrene, chlorostyrene or mixtures thereof, is employed as a crosslinking solvent, and an organic peroxide is usually employed to catalyze the crosslinking reaction. The unsaturated polyesters are characterized by thermosetting without evolution of water. Commericial unsaturated polyester resins usually contain a mixture of unsaturated polyesters and unsaturated monomeric solvent.

Polyols used in the preparation of commercial polyesters include: ethylene glycol, propylene glycol, various butylene glycols, diethylene glycol and triethylene glycol.

Maleic anhydride or phthalic anhydride and fumaric acid are the most frequently used unsaturated acids in the preparation of unsaturated polyesters. Other suitable unsaturated acids are citraconic acid, messconic acid, itaconic acid and 3:6 endomethylene tetrahydro phthalic anhydride. Equimolar proportions of glycol and dibasic acid are usually used. The unsaturated acid is frequently modified with other dibasic acids, usually phthalic acid or anhydride, sebacic acid and adipic acid, to improve the flexibility of the thermoset product. In some instances trihydric alcohols, such as glycerine, or esters such as castor oil, or higher alcohols, such as pentaerythritol or sorbitol, are used to modify the product.

As mentioned, the crosslinking reaction is catalyzed with a peroxide catalyst, usually benzoyl peroxide. Other catalysts are methyl ethyl ketone peroxide and methyl isobutyl ketone peroxide.

Accelerators, stabilizers, promotors and coloring agents may be incorporated in the polyester when desired, as well as reinforcing agents, such as glass or sisal, and auxiliary fillers such as fibrous asbestos, calcium carbonates, etc.

In the preparation of moldable polyester mixes employing the novel coated kaolin, the clay is added to the unsaturated liquid polyester resin in the same manner and with equipment usually employed for adding clay or other fillers to the resin.

The quantity of clay that is used is usually within the range of from 10% to 50%, based on the weight of the liquid unsaturated polyester (inclusive of the polymerizable monomer, such as styrene).

After the ester and clay are dispersed in the liquid polymerizable unsaturated monomer and catalyst added, the mixture is placed in a suitable mold and cured in a manner applicable to the particular polyester resin employed.

In practicing the embodiment of my invention in which the polyoxyethylene fatty acid ester and clay filler are incorporated separately into a system such as polyester or polystyrene which contains a clay-reactive monomer, the liquid polyoxyethylene fatty acid ester is stirred into the reactive system before the clay is added. Substantially the same proportion of polyoxyethylene fatty acid ester to clay is employed as when the ester is precoated on the clay. After the clay is added, conventional catalyst may be incorporated.

The following examples are given to illustrate the invention and to show the advantage thereof.

Example I

The following nonionic surface active agents were coated on kaolin clay and the coated clays were mixed with styrene monomer. The presence or absence of reaction of the coated clays with the styrene was noted. A control kaolin clay, uncoated, was tested in the same manner. In each case, the clay employed was "ASP 400 P," a water-washed Georgia kaolin having an average equivalent spherical diameter of 4.8 microns and a free moisture content below 1%. The pH of the clay, as determined by TAPPI Tent. Std. T645 M–54, was 3.8–4.6.

All coated clays were prepared by adding the dry, minus 325 mesh clay to a twin-shell blender (V-Blendor) and tumbling without addition of liquid for 10 minutes. The surface active agent was diluted in about equal parts by weight with a solvent (mineral spirits) and then introduced into the twin-shell blender. The mixing was continued for five additional minutes and the minus 325 mesh product discharged. The coated clay was employed without removing the mineral spirits solvent.

Reactivity was tested by warming 20 cc. of styrene in an aluminum cup on a hot plate maintained at 250° F. and adding 2 grams of clay to the warm styrene monomer. The styrene monomer that was employed in the test contained about 50 p.p.m. of tertiary butyl catechol as an inhibitor. After addition of the clay to the liquid monomer, the system was observed continuously for three minutes. When reactive with the monomer, reaction occurred substantially instantaneously and was very vigorous, causing polymerization and hardening of the monomer. The test was carried out with warm styrene monomer to permit rapid evaluation of reactivity since the rate of reaction is increased substantially by heating the monomer. A clay which would react immediately with the styrene monomer under the test conditions employed would react at ambient temperature with the monomer given sufficient time. A clay which reacted immediately under the test would then be expected to interfere with the normal free radical catalyzed polymerization of the monomer.

The results, summarized in table form, show that nonionic polyoxyethylene fatty acid esters prevented reaction between the dry clay and styrene monomer when the esters were precoated on the clay. The results show also that nonionic surface active agents that did not contain polyethoxy groups were ineffective in preventing reaction between the clay and the monomer.

EFFECT OF NONIONIC SURFACE ACTIVE AGENTS AS COATING AGENT FOR KAOLIN CLAY ON THE REACTION BETWEEN THE CLAY AND STYRENE MONOMER

| Trade name | Composition of surface active agent | Reaction between clay and monomer |
|---|---|---|
| | No coating on clay | Violent reaction within 1 minute. |
| Ethofat C-25 | Ethoxylated coco-fatty acids having 15 mols ethylene oxide/mol. acid. | None. |
| Ethofat 60/25 | Ethoxylated stearic acid having 5 mols ethylene oxide per mol acid. | Do. |
| Nonpolyethoxylated nonionic surface active agents | | |
| Span 80 | Sorbitan monooleate | Violent reaction within 1 minute. |
| Atpet 200 | Sorbitan partial fatty ester | Do. |

Example II

In a typical application of this invention, a coarse size fraction of kaolin filler clay (pH about 4.0 and $pK_a$ below 1) is mixed in a cement mixer with 1% by weight of "Ethofat C-25." The mixture is pulverized in a Mikro-Pulverizer (a high speed hammer mill) until substantially all the material is minus 325 mesh (Tyler) when analyzed by a wet-screen method.

A polyester resin molding is prepared with the coated clay filler as follows. The coated clay is mixed in amount of 29 parts by weight with 63 parts by weight of a polyester prepared by esterification of ethylene glycol with fumaric acid and 7 parts by weight of a styrene monomer. The catalyst, benzoyl peroxide, is added in amount of 1 part by weight and the mixture is molded with fiberglass reinforcement in a hydraulic press using matched metal molds. The part is cured for four minutes at 250° F.

Example III

Still in accordance with this invention, a fluid energy milled, colloidal grade of attapulgite clay (Attagel 40) is dried at about 150° F. to a free moisture content below 1%. The clay is uniformly coated with 3% by weight of "Ethofat 0/15" which is the condensation product of ethylene oxide with oleic acid having 5 ethylene oxide mols per mol oleic acid. The mixture is pulverized to minus 325 mesh in a high speed hammer mill and employed with a laminating mixture of the following composition to make a fiberglass-reinforced panel.

|  | Parts by weight |
|---|---|
| Polyester resin | 76.5 |
| Styrene monomer | 8.5 |
| Benzoyl peroxide | 1.0 |
| Coated attapulgite filler | 14.0 |
|  | 100.0 |

Example IV

The following tests were carried out to demonstrate the effectiveness of a polyoxyethylene fatty acid ester in preventing the polymerization of an ethylenically unsaturated monomer as a result of contact therewith of a clay having acid sites by incorporating the ester with the monomer before adding the clay to the monomer.

To 150 parts by weight of warm styrene monomer, 0.45 part by weight of "Ethofat C-25" was added dropwise. The ingredients were mixed thoroughly. Dry "ASP 400P" was gradually added in amount of 150 parts by weight. No reaction occurred.

The procedure was repeated except that a fatty acid ester of polyoxyethylene glycol was not incorporated into the styrene before the clay was added. In this case, a vigorous reaction occurred and the monomer polymerized and hardened.

It was thus demonstrated that the "Ethofat C-25" was effective in preventing polymerization of the monomer as a result of contact with the clay when the ester was added to the monomer before the clay was added.

I claim:

1. A dry clay having acid surface sites, the particles of said clay being coated with from ½% to 5% by weight of a polyoxyethylene fatty acid ester of the formula:

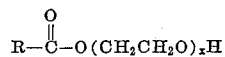

wherein R is selected from the group consisting of alkyl containing 7 to 19 carbon atoms, alkenyl containing 7 to 19 carbon atoms and abietyl, and $x$ is an integer from 2 to 50, inclusive.

2. The composition of claim 1 wherein said clay is kaolin and said ester is present in amount within the range of ½% to 3% of the clay weight.

3. The composition of claim 1 wherein said clay is kaolin and said ester is present in amount of about 1% of the clay weight.

4. The composition of claim 1 wherein said clay is minus 325 mesh kaolin clay having a free moisture content below 1% and being substantially free from clay dispersants.

5. The compression of claim 4 wherein said kaolin clay is coated with from ½% to 3% by weight of the coconut fatty acid ester of polyoxyethylene glycol containing from 5 to 15 polyoxyethylene groups.

6. The composition of claim 1 wherein said clay is attapulgite clay.

References Cited

UNITED STATES PATENTS

| 3,067,053 | 12/1962 | Tarantino | 106—308O |
| 3,094,499 | 6/1963 | Gassmann et al. | 106—308O |
| 3,278,479 | 10/1966 | Ferrigno | 106—308O |
| 3,425,980 | 2/1969 | Baum | 106—308O |

JAMES E. POER, Primary Examiner

U.S. Cl. X.R.

106—308Q